US009237280B2

(12) United States Patent
Kim et al.

(10) Patent No.: US 9,237,280 B2
(45) Date of Patent: Jan. 12, 2016

(54) PHOTOGRAPHING APPARATUS AND PHOTOGRAPHING METHOD FOR CORRECTING A MOVING CHARACTERISTIC OF AN ELECTRONIC FRONT CURTAIN

(75) Inventors: Il-do Kim, Suwon-si (KR); Jeong-won Lee, Seongnam-si (KR); Jae-joon Moon, Anyang-si (KR)

(73) Assignee: Samsung Electronics Co., Ltd (KR)

(*) Notice: Subject to any disclaimer, the term of this patent is extended or adjusted under 35 U.S.C. 154(b) by 300 days.

(21) Appl. No.: 13/356,200

(22) Filed: Jan. 23, 2012

(65) Prior Publication Data

US 2012/0212634 A1  Aug. 23, 2012

(30) Foreign Application Priority Data

Feb. 21, 2011  (KR) .................. 10-2011-0015095

(51) Int. Cl.
*H04N 5/235* (2006.01)
*H04N 5/353* (2011.01)

(52) U.S. Cl.
CPC ........... *H04N 5/3532* (2013.01); *H04N 5/2353* (2013.01)

(58) Field of Classification Search
CPC .... H04N 5/235; H04N 5/3532; H04N 5/2353
USPC ..................................... 348/221.1
See application file for complete search history.

(56) References Cited

U.S. PATENT DOCUMENTS

| 5,532,785 | A  | * | 7/1996 | Goto et al. .................... 396/246 |
| 6,542,194 | B1 | * | 4/2003 | Juen .............................. 348/367 |
| 7,583,312 | B2 |   | 9/2009 | Hiramatsu |
| 2005/0110894 | A1 |   | 5/2005 | Hiramatsu |
| 2006/0087573 | A1 | * | 4/2006 | Harada ......................... 348/294 |
| 2006/0098115 | A1 |   | 5/2006 | Toyoda |
| 2008/0151087 | A1 | * | 6/2008 | Matsumoto .................. 348/296 |
| 2008/0284873 | A1 | * | 11/2008 | Miyanari ................... 348/229.1 |
| 2008/0291306 | A1 | * | 11/2008 | Totori ........................... 348/296 |
| 2009/0213233 | A1 | * | 8/2009 | Kido ........................... 348/208.4 |
| 2010/0045852 | A1 | * | 2/2010 | Tanaka et al. ................ 348/362 |
| 2011/0019070 | A1 | * | 1/2011 | Moon ........................... 348/362 |
| 2011/0050946 | A1 | * | 3/2011 | Lee et al. .................... 348/222.1 |
| 2011/0141331 | A1 | * | 6/2011 | Lee et al. ..................... 348/297 |

(Continued)

FOREIGN PATENT DOCUMENTS

| EP | 1 898 635 | 3/2008 |
| EP | 2 280 539 | 2/2011 |

(Continued)

*Primary Examiner* — Nicholas Giles
*Assistant Examiner* — Abdelaaziz Tissire
(74) *Attorney, Agent, or Firm* — The Farrell Law Firm, P.C.

(57) ABSTRACT

A photographing apparatus includes a detection unit for detecting light exposure error resulting from a difference in a moving characteristic between a mechanical rear curtain and an electronic front curtain using data of some area constituting an image sensor, a signal generating unit for generating a reset signal of the image sensor, and a control unit for controlling to correct a moving characteristic of the electronic front curtain using the detected light exposure error and generate a reset signal of the image sensor according to the corrected moving characteristic. Accordingly, a moving characteristic of an electronic front curtain may be conveniently corrected by a user.

14 Claims, 10 Drawing Sheets

(56) References Cited

U.S. PATENT DOCUMENTS

2011/0149129 A1* 6/2011 Kim et al. .................... 348/296
2011/0181754 A1* 7/2011 Iwasaki ...................... 348/230.1

FOREIGN PATENT DOCUMENTS

| JP | 2005159418 | 6/2005 |
| JP | 2008-278335 | 11/2008 |

* cited by examiner

PHOTOGRAPHING APPARATUS AND PHOTOGRAPHING METHOD FOR CORRECTING A MOVING CHARACTERISTIC OF AN ELECTRONIC FRONT CURTAIN

PRIORITY

This application claims priority from Korean Patent Application No. 10-2011-0015095, filed on Feb. 21, 2011 in the Korean Intellectual Property Office, the contents of which are incorporated herein by reference.

BACKGROUND OF THE INVENTION

1. Field of the Invention

The present invention relates generally to a photographing apparatus and a photographing method thereof, and more particularly, to a photographing apparatus and method using a focal plane shutter.

2. Description of the Related Art

The shutter of a camera may be generally classified into a lens shutter and a focal plane shutter. The lens shutter is located in the proximity of a lens, whereas the focal plane shutter is located in the proximity of a focal surface.

The focal plane shutter is classified into a horizontal shutter and a vertical shutter, according to moving directions of front and rear curtains. The vertical shutter enjoys wide use due to efficient performance.

Figure 1A:
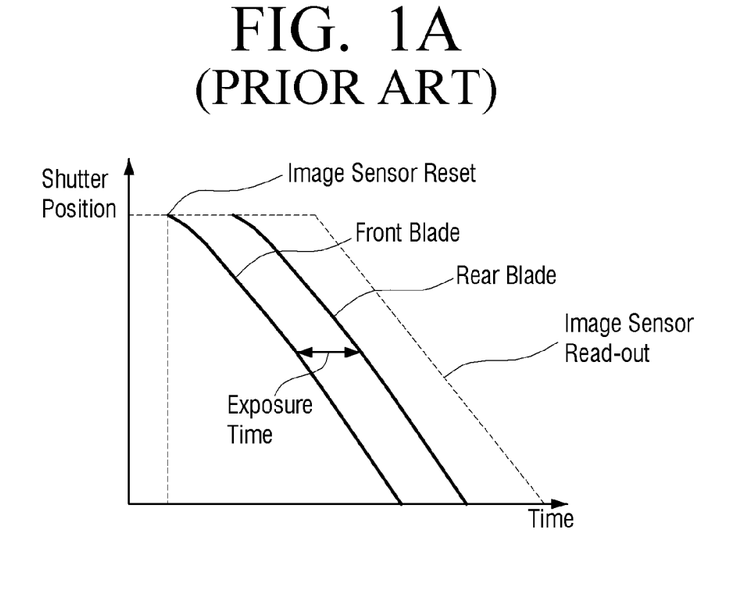
FIGS. 1A and 1B illustrate operation of a focal plane shutter and an electronic shutter, respectively, according to the prior art.

The focal plane shutter is located in front of an image sensor of a camera and passes or blocks light which penetrates a lens by opening or closing the front and rear curtains in front of the image sensor of the camera according to an operation state of the camera. When a user starts photographing, the front curtain moves as illustrated in FIG. 1A, thereby starting light exposure of an image sensor, which light exposure concludes as the rear curtain moves after a time elapses according to a shutter speed determined by the camera.

The focal plane shutter has several disadvantages. First, a shutter release lag increases when a live-view is used. Recently, an Electronic View Finder (EVF) or a live-view image photographed by an image sensor of a rear Liquid Crystal Display (LCD) has been more commonly used instead of an Optical View Finder (OVF). For this, a focal plane shutter maintains an open state in which a front curtain is down and a rear curtain is up. In this state, when a user starts photographing, a charging operation in which the front curtain, which has been down, is raised to an upper part of the shutter is required. That is, as a shutter operation sequence increases to provide a live-view image, a shutter release lag also increases.

Second, image quality may deteriorate due to shutter shock. In a focal plane shutter, the movement of a front curtain is completed during the light exposure of an image sensor as illustrated in FIG. 1A. As the movement of the front curtain is completed, mechanical vibration occurs, shaking the image sensor and thereby causing to deterioration of image quality.

Figure 1B:
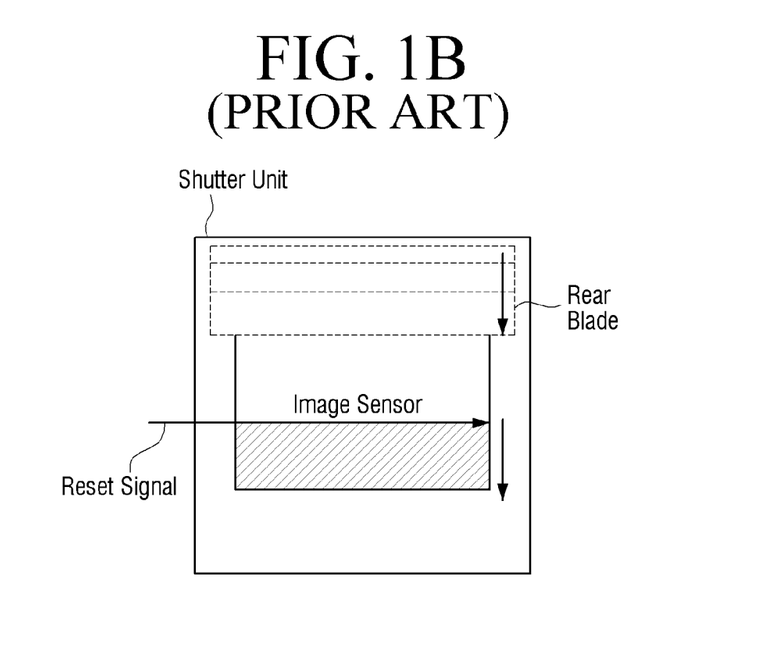

In order to resolve the above disadvantages, an electronic shutter that serves as a front curtain of a focal plane shutter by sequentially processing a reset signal of an image sensor by pixel line is widely used as illustrated in FIG. 1B.

The electronic shutter controls a light exposure time of an image senor according to transmission of an electronic signal of the image sensor and operation of a mechanical rear curtain, so a timing of the electronic signal of the image sensor should be closely interlocked with a moving characteristic of the mechanical rear curtain. Conventionally, a detection unit is provided to add a photographing sequence for observing or detecting a moving characteristic of a mechanical rear curtain so that an electronic signal of an image sensor and an operation time of a mechanical rear curtain may be adjusted.

However, according to the conventional method, the detection unit should be provided on a focal plane shutter, which increases the size and price of the focal plane shutter. If a photo interrupt is used to detect a moving characteristic of a mechanical rear curtain, light entering into a lens should be shielded, which may cause technical difficulty.

In addition, if a moving characteristic of a mechanical rear curtain is detected using an image formed on an image sensor without using a detection unit, further image photographing is required to detect the moving characteristic of the mechanical rear curtain, causing inconvenience to a user.

SUMMARY OF THE INVENTION

Embodiments of the present invention are provided to overcome the above and other disadvantages of the prior art.

An aspect of the present invention provides a photographing apparatus for correcting a moving characteristic of an electronic front curtain and a photographing method thereof.

A photographing apparatus of the present invention includes a detection unit which detects light exposure information resulting from a difference in a moving characteristic between a rear curtain and a front curtain in data of some area of an image sensor, a signal generating unit which generates a reset signal of the image sensor, and a control unit which controls to correct a moving characteristic of the front curtain using the detected light exposure information and generate a reset signal of the image sensor according to the corrected moving characteristic.

The front curtain may be an electric front curtain and the rear curtain may be a mechanical rear curtain.

The light exposure information may be an amount of light exposure based on a light exposure time.

The control unit may control to correct a delay amount of the front curtain using the detected light exposure information and to generate the reset signal by correcting the reset signal according to the corrected delay amount.

The control unit may control to correct the moving characteristic of the front curtain using a light exposure information detected in previous photographing and to apply to a present photographing by correcting the reset signal according to the corrected moving characteristic The photographing apparatus may further comprise an image correction unit which performs follow-up correction later on a pre-photographed image using the detected light exposure information.

The control unit may control the image correction unit to perform the follow-up correction when a light exposure information of the pre photographed image is more than a predetermined threshold.

The some area of the image sensor may be an area that is not used to form an image during photographing.

A photographing method of the present invention includes detecting light exposure information resulting from a difference in a moving characteristic between a rear curtain and an front curtain in data of some area of an image sensor, correcting a moving characteristic of the front curtain using the detected light exposure information; and generating a reset signal of the image sensor according to the corrected moving characteristic.

The front curtain may be an electric front curtain and the rear curtain is a mechanical rear curtain.

The light exposure information may be an amount of light exposure based on a light exposure time.

The correcting may correct a delay amount of the front curtain using the detected light exposure information and, the generating may generate the reset signal by correcting the reset signal according to the corrected delay amount.

The correcting corrects the moving characteristic of the front curtain using a light exposure information detected in previous photographing, the photographing method further comprises applying to a present photographing by correcting the reset signal according to the corrected moving characteristic.

The photographing method further comprises performing follow-up correction later on a pre-photographed image using the detected light exposure information.

The performing follow-up correction later may perform the follow-up correction when a light exposure information of the pre photographed image is more than a predetermined threshold.

The some area of the image sensor may be an area that is not used to form an image during photographing.

BRIEF DESCRIPTION OF THE DRAWINGS

The above and/or other aspects will be more apparent by describing in detail embodiments, with reference to the accompanying drawings in which.

DETAILED DESCRIPTION OF EMBODIMENTS OF THE INVENTION

Embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the embodiments. Thus, it is apparent that the embodiments can be carried out without those specifically defined matters. Also, functions or elements known in the related art are not described in detail for the sake of clarity and conciseness.

Figure 2:
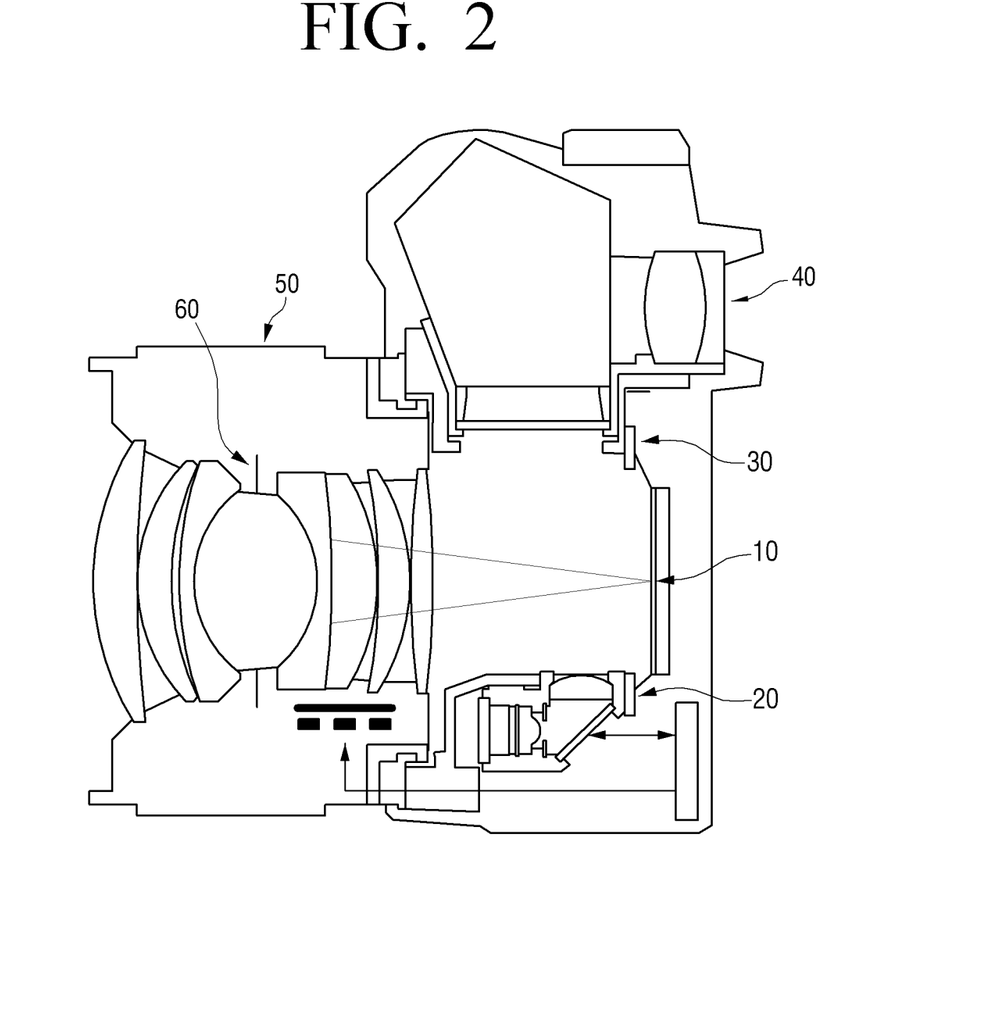
FIG. 2 illustrates a photographing apparatus adopting a focal plane shutter according to the present invention.

FIG. 2 illustrates a photographing apparatus adopting a focal plane shutter according to the present invention. The photographing apparatus comprises an image sensor 10, a mechanical front curtain 20, a mechanical rear curtain 30, a view finder 40, a lens 50, and an iris 60.

As shown in FIG. 2, a photographing apparatus that operates with a focal plane shutter includes the mechanical front curtain 20 and the mechanical rear curtain 30 of the focal plane shutter located ahead of the image sensor 10.

The image sensor 10 receives light through the lens 50 and converts the light into an electrical signal, and may be a Charge-Coupled Device (CCD) or a Complementary Metal-Oxide Semiconductor (CMOS) Image Sensor (CIS). According to an embodiment, the image sensor 10 controls a reset timing to begin accumulating charge by an imaging element. The image sensor 10 replaces the mechanical front curtain 20 and operates as an electronic front curtain.

The mechanical front curtain 20 and the mechanical rear curtain 30 of the focal plane shutter serve to open and close an optical path to the image sensor 10. According to the moving direction of the front curtain and the rear curtain, there may be a horizontal shutter and a vertical shutter. Hereinafter, the vertical shutter will be described.

The mechanical front curtain 20 shields the image sensor from light before the image sensor 10 is exposed to the light, and moves to expose the image sensor 10 to the light. The mechanical rear curtain 30 finishes the light exposure after the front curtain 20 begins the light exposure. In this manner, the focal plane shutter performs light exposure while moving in a slit pattern (parallel movement, leaving a gap at intervals), such as scanning the image sensor 10.

The iris 60 is disposed within a lens to control an aperture diameter and an amount of light passing through the lens. In the case of a lens shutter, as the aperture diameter increases, it is more difficult to operate as a high speed shutter. In the case of a focal plane shutter, moving in a slit pattern makes it possible to use a highest speed shutter at any aperture value.

The view finder 40 is an instrument through which a user sees an image in order to image or focus it when photographing the image using a photographing apparatus.

Herein, a photographing apparatus is set to be a camera, but the photographing apparatus is not limited thereto. The technical feature of the present invention may be applied to any apparatus having a photographing function such as a camcorder and a mobile device such as a mobile phone.

Figure 3:
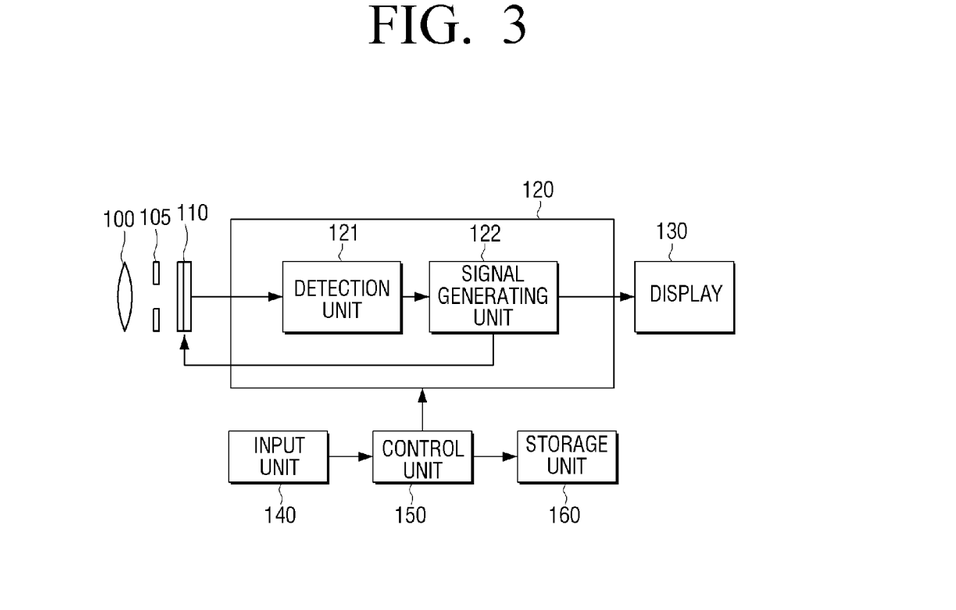
FIG. 3 illustrates the configuration of the photographing apparatus according to the present invention.

FIG. 3 illustrates the configuration of the photographing apparatus according to the present invention. The photographing apparatus includes a lens 100, a mechanical shutter 105, an image sensor 110, a digital signal processing unit 120, a display 130, a control unit 140, an input unit 150, and a storage unit 160.

The lens 100 receives an image of a subject, and the mechanical shutter 105 adjusts exposure of light into the image sensor 110 through a moving slit. The image sensor 110 converts an incident optic signal into an electrical signal and adjusts an amount of light exposure through an electronic front blade function. Herein, the electronic front blade is configured to serve as a front curtain of a focal plane shutter by sequentially processing a reset signal of the image sensor by line, as described above.

After an incident optical signal is converted into an electrical signal by the image sensor 110, it may be converted into a digital signal in the Digital Signal Processing unit 120 (DSP) and displayed through the display 130.

Herein, the DSP 120 may include a detection unit 121 and a signal generating unit 122.

The detection unit 121 detects light exposure information resulting from a difference in a moving characteristic between a rear curtain and a front curtain using data of some area constituting the image sensor 110. Herein, the front curtain may be an electric front curtain and the rear curtain may be a mechanical rear curtain. Also, The light exposure information may be an amount of light exposure based on a light exposure time. Herein, some area constituting the image sensor 110 may be an area which is not used to form an image during photographing. Herein, the area may be a dummy area (or an active dummy area). The detailed description regarding this will be provided later with reference to a corresponding drawing.

The signal generating unit 122 generates a reset signal of the image sensor 110.

In particular, the signal generating unit 122 may correct a moving characteristic of an electronic front curtain using light exposure error detected by the detection unit 121 under the control of the control unit 140 and generate a reset signal of the image sensor 110 according to the corrected moving characteristic.

In addition, the detection unit 121 may detect a difference in a moving character between a mechanical rear curtain and an electronic front curtain by comparing an odd line output value with an even line output value of a pixel row corresponding to a dummy area of the image sensor 110.

Although not illustrated in the drawings, an image correction unit (not shown) may perform follow-up correction later on a pre-photographed image using the detected light exposure information by the detection unit 121.

In addition, the DSP 120 may further include Automatic Gain Control (AGC, not shown), Analog to Digital Converter (ADC, not shown), Image Signal Processor (ISP, not shown), and Auto Exposure control unit (AE, not shown).

The AGC (not shown) circuit may amplify an input analog signal to become a signal having an appropriate scale, and Direct Current (DC, not shown) circuit may convert the amplified analog signal to a digital signal.

The ISP may perform signal-processing so that an input image signal may be displayed. In addition, the ISP may receive signals of each area of the image sensor 110 that has different degree of light exposure, correct and synthesize the received signals, generate an entire image signal, and provide the generated signal to the display 130.

The AE control unit (not shown) provides an appropriate amount of exposure with respect to each area of the image sensor 110 by controlling a movement of the mechanical shutter 105 and an electronic shutter operation of the image sensor 110 using exposure information calculated by the ISP.

The display 130 displays an image signal that has been processed by the digital signal processing unit 120 so that a use may immediately view the signal. In addition, the display 130 generates an On-Screen Display (OSD) for user convenience.

The control unit 140 controls an overall process such as amplifying, converting, and processing a signal. The control unit 140 receives a user's command input from the input unit 150 and controls a camera module based on the received command.

In particular, the control unit 140 may correct a moving characteristic of an electronic front curtain using light exposure information detected by the detection unit 121 and control the signal generating unit 122 to generate a reset signal of the image sensor according to the corrected moving characteristic.

In particular, the control unit 140 may correct an delay amount of the front curtain using the detected light exposure information detected by the detection unit 121 and control the signal generating unit 122 to generate the reset signal by correcting the reset signal according to the corrected delay amount.

Also, the control unit 140 may control to correct the moving characteristic of the front curtain using a light exposure information detected in previous photographing and to apply to a present photographing by correcting the reset signal according to the corrected moving characteristic.

If time corresponding to a ratio of light exposure time is elapsed after scanning of an electronic front curtain begins, the control unit 140 may control the signal generating unit 122 to scan a reset signal which is the same as a moving characteristic of an electronic front curtain only on an odd line or an even line of a pixel row corresponding to a dummy area of the image sensor 110. The ratio may be ½, but is not limited thereto.

Accordingly, the detection unit 121 may detect light exposure error resulting from a difference in a moving character between a mechanical real curtain and an electronic front curtain using data of a dummy area.

The storage unit 160 stores a current image or information required to control a photographing apparatus.

Figure 4:
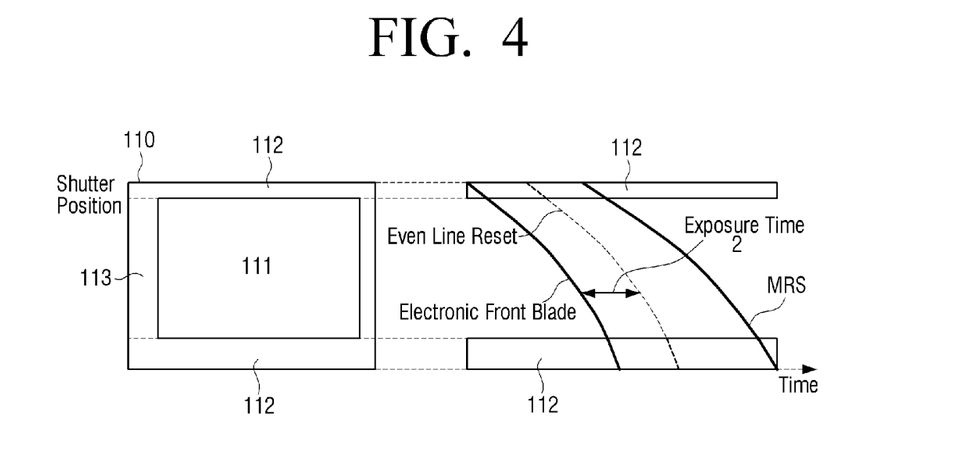
FIG. 4 illustrates division of an image sensor area according to the present invention.

FIG. 4 illustrates division of an image sensor area according to the present invention.

As illustrated in FIG. 4, the image sensor 110 includes an active area 111 for storing a photographed image, an active dummy area 112 for performing additional functions, and an optical black area 113. An image received from the lens 100 is projected to the active area and the active dummy area. When a user starts photographing using an electronic front curtain function, an additional even line reset signal may be applied to the active dummy area 112 to detect a moving characteristic of a mechanical rear curtain.

Figure 5A:
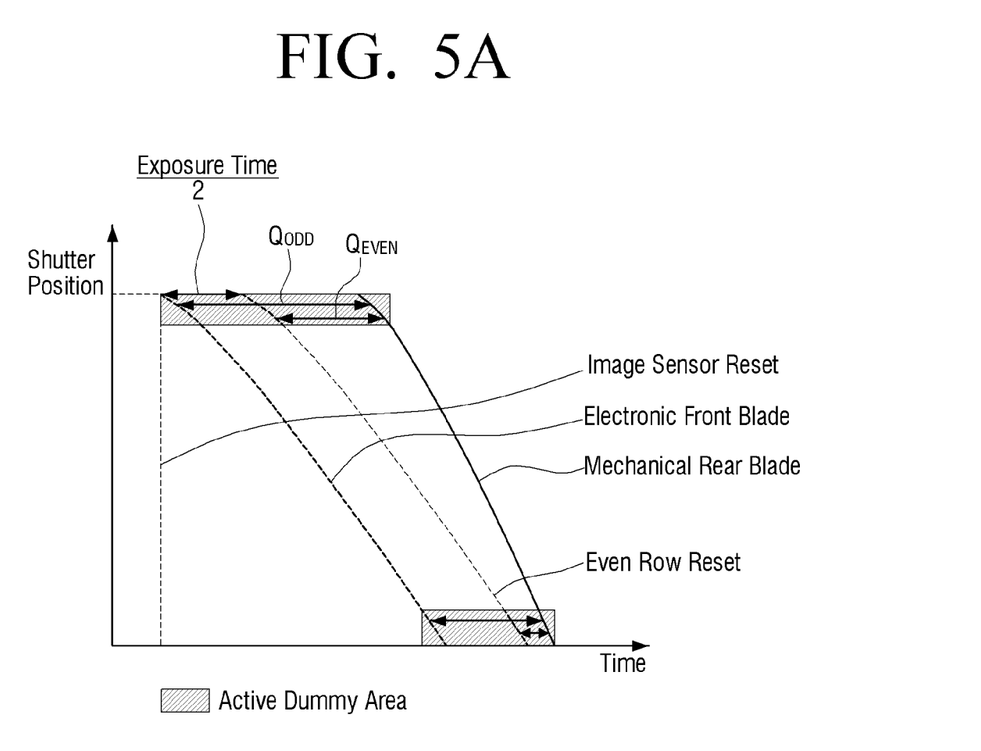
FIGS. 5A and 5B illustrate a method for correcting a moving characteristic according to a first embodiment of the present invention.
Figure 5B:
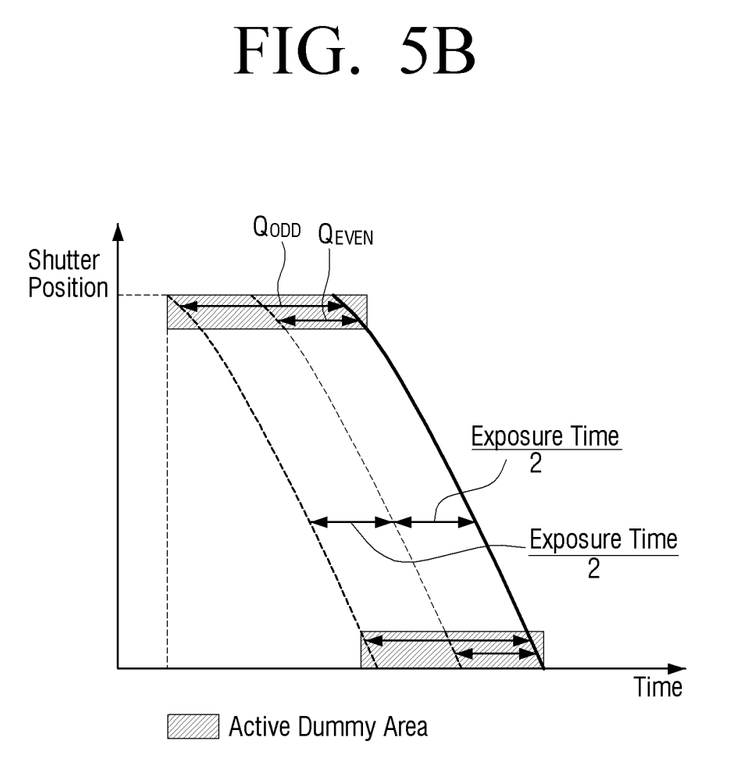

FIGS. 5A and 5B illustrate a method for detecting a moving characteristic of a mechanical rear curtain and a method for renewing a moving characteristic of an electronic front curtain, respectively, according to a first embodiment of the present invention.

When a user starts photographing, the image sensor 110 resets all pixels to be ready for light exposure, as illustrated in FIG. 5A.

Once the reset process is completed, the signal generating unit 122 scans an electronic front curtain by applying a reset signal sequentially from an upper pixel row according to a pre-stored moving characteristic of an electronic front curtain.

If ½ of light exposure time elapses after scanning of an electronic front curtain begins, an even line reset signal which is the same as a moving characteristic of an electronic front blade, is scanned only on an even line of a pixel row corresponding to an active dummy area. Through this process, a light exposure time of an odd line row changes from that of an even line row in the active dummy area.

As illustrated in FIG. 5B, if a moving characteristic of a mechanical rear curtain is ideally the same as a moving characteristic of an electronic front blade, an output value of an odd line row becomes twice that of an even line row.

However, if a moving characteristic of a mechanical rear curtain is inconsistent with a moving characteristic of an electronic front blade, the ratio of output values changes. An exposure error detector in the DSP calculates how much the electronic front blade is delayed in comparison with the mechanical rear curtain based on the ratio.

The image sensor 110 has an active dummy area in upper and lower parts of an active area, respectively, and thus a user may check an initial offset of an electronic front curtain from data of the upper active dummy area and an entire accumulative offset of an electronic front curtain from data of the lower active dummy area, from data of the image photographed by the user.

The signal generating unit 122 may receive an initial offset and an accumulative offset calculated by the detection unit 121 and rationalize a moving characteristic of an electronic front curtain with a moving characteristic of a mechanical rear curtain by renewing a pre-stored moving characteristic of the electronic front curtain.

Accordingly, a moving characteristic of an electronic front curtain may be corrected while a user performs photographing.

Figure 6A:
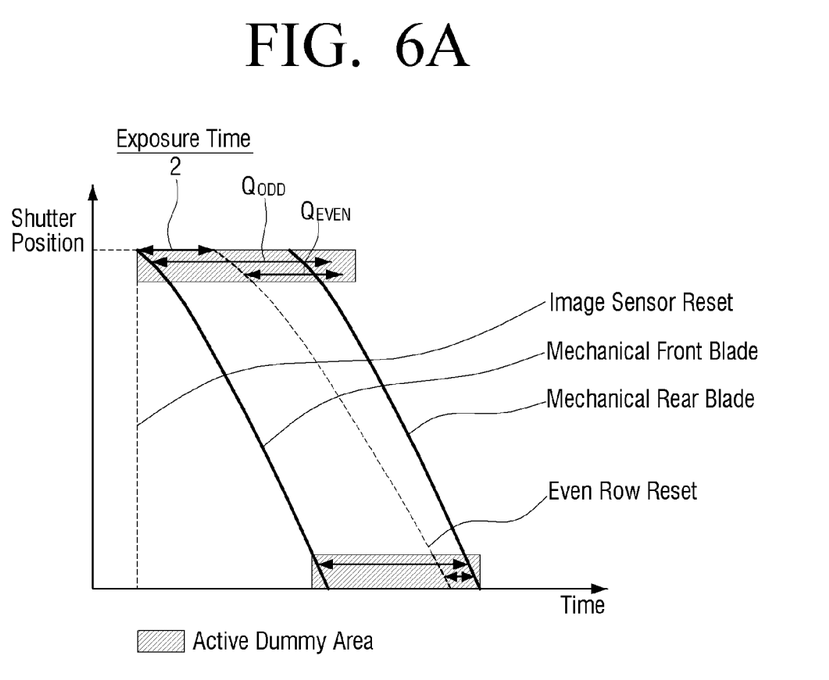
FIGS. 6A and 6B illustrate a method for correcting a moving characteristic according to a second embodiment of the present invention.
Figure 6B:
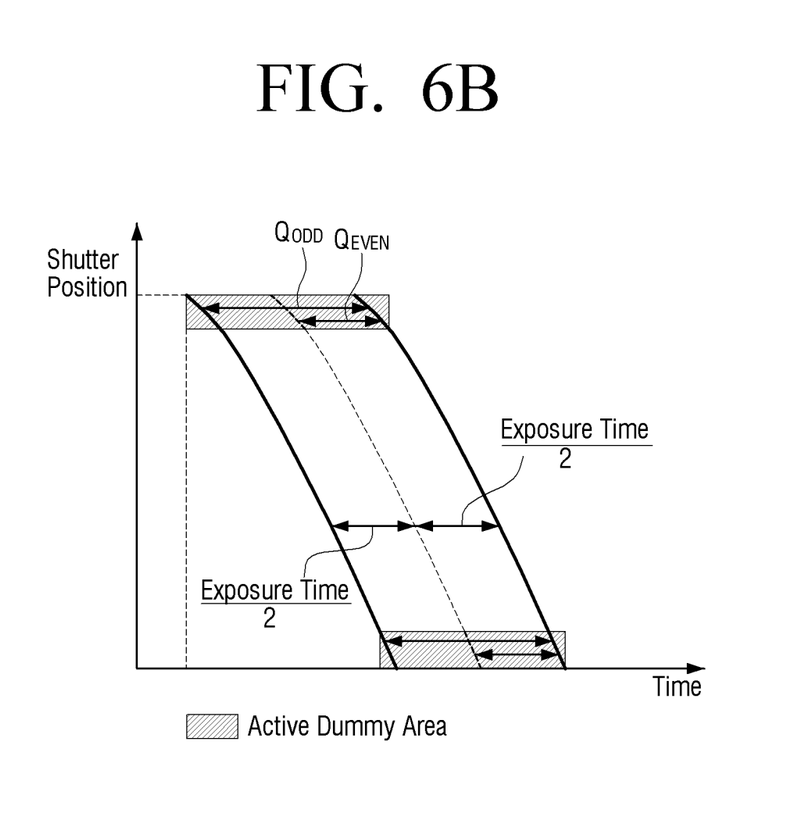

FIGS. 6A and 6B illustrate a method for correcting a moving characteristic according to a second embodiment of the present invention.

According to FIGS. 6A and 6B, a moving characteristic of an electronic front curtain may be corrected using a method similar to the method of the first embodiment when a mechanical front curtain and a mechanical rear curtain are used in a photographing apparatus using an electronic front curtain.

Figure 7:
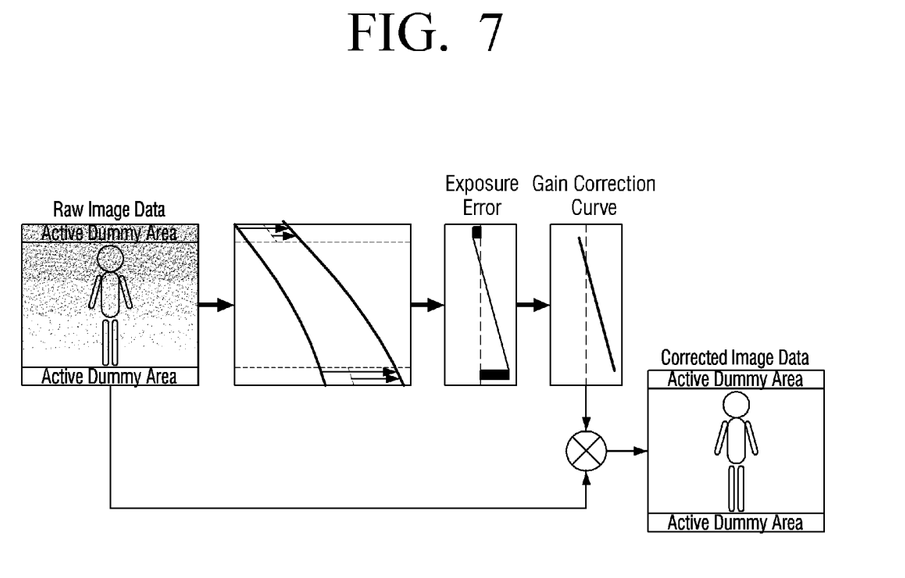
FIG. 7 illustrates a method for correcting light exposure error by detecting a moving characteristic of a mechanical rear curtain according to the present invention.

FIG. 7 illustrates a method for correcting light exposure error by detecting a moving characteristic of a mechanical rear curtain according to the present invention.

As described above with reference to FIGS. 5A, 5B, 6A, and 6B, a moving characteristic of an electronic front curtain may be corrected while a user performs photographing. However, the corrected moving characteristic of an electronic front curtain is applied from second photographing and thus, a photographing image before the correction includes some light exposure error. Such light exposure error may be minimized as light exposure calculated by the detection unit is applied to a gain correction curve so that an image correction unit (not shown) provided on the DSP 120 performs follow-up correction later, as illustrated in FIG. 7.

Figure 8:
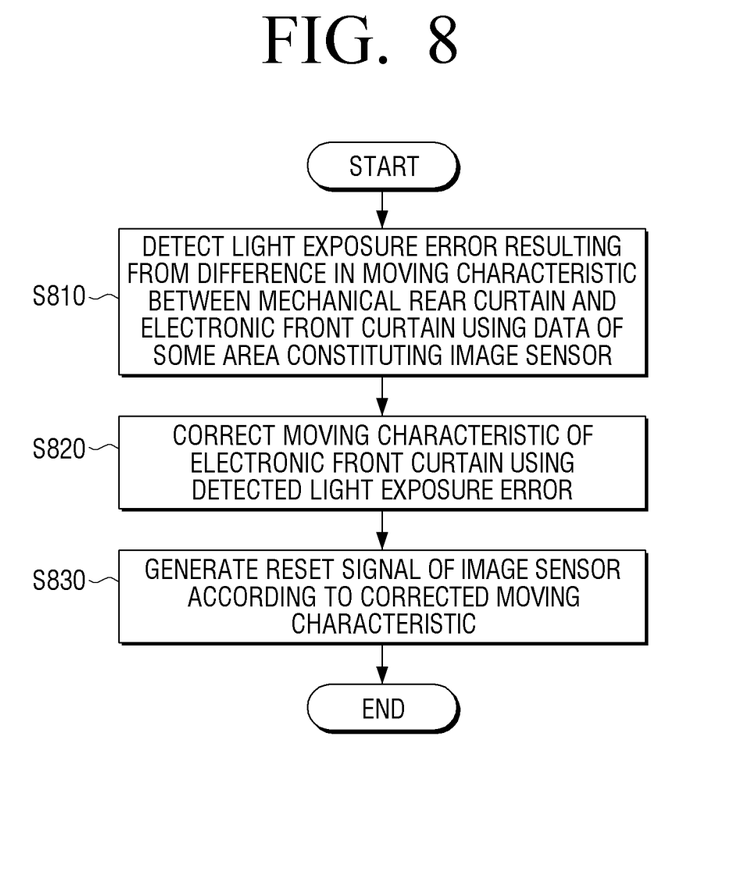
FIG. 8 illustrates a photographing method according to the present invention.

FIG. 8 illustrates a photographing method according to the present invention.

According to a photographing method illustrated in FIG. 8, light exposure error resulting from a difference in a moving characteristic between a mechanical rear curtain and an electronic front curtain is detected using data of some area constituting the image sensor in step S810. Herein, some area constituting the image sensor may be a dummy area that is not used to form an image during photographing. The electronic front curtain is configured to serve as a front curtain of a focal plane shutter by sequentially processing a reset signal of the image sensor by line.

Subsequently, a moving characteristic of the electronic front curtain is corrected using the detected light exposure error in step S820.

A reset signal of the image sensor is generated according to the corrected moving characteristic in step S830.

Specifically, if time corresponding to a ratio (such as ½) of light exposure time is elapsed after scanning of an electronic front curtain begins, a reset signal which is the same as a moving characteristic of the electronic front curtain may be scanned only on an odd line or an even line of a pixel row corresponding to a dummy area. Accordingly, light exposure error resulting from a difference in a moving characteristic between a mechanical rear curtain and an electronic front curtain may be detected using data of a dummy area.

In addition, a difference in a moving direction between a mechanical rear curtain and an electronic front curtain may be detected by comparing an odd line output value with an even line output value of a pixel row corresponding to a dummy area in step S810.

Furthermore, a pre-photographed image may be corrected using light exposure error detected in step S810.

Figure 9:
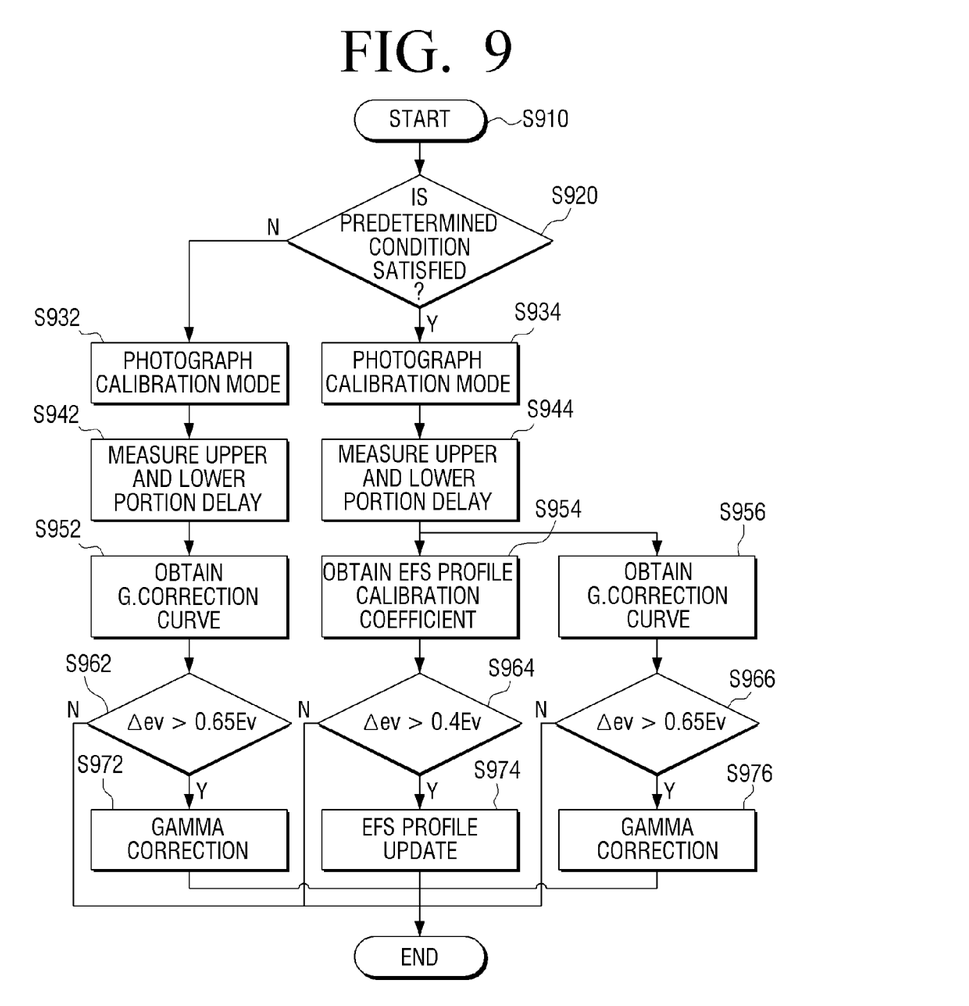
FIG. 9 illustrates a method for correcting a moving characteristic of an electronic front curtain in real time according to the present invention.

FIG. 9 illustrates a method for correcting a moving characteristic of an electronic front curtain in real time according to the present invention.

According to FIG. 9, in order to perform real-time calibration, it is first determined whether a condition is satisfied in step S920. The condition may be set considering a shutter speed, an iris, a subject, a focus distance, and a photographing posture. For example, the condition may be a plurality of conditions to include more than ½000 of shutter speed, recommend iris (middle open), image type, appropriate amount of exposure in a lower portion, recommend focus distance for each lens, photographing posture rotation, and less than 15 degree of tilt.

Depending on whether the conditions in step S920 are satisfied, a corresponding calibration mode photographing begins in steps S932, S934.

Subsequently, delay in upper and lower portions is measured using the above-described method in steps S942, S944.

If the conditions are not satisfied, G. Correction Curve is obtained using the measured delay when the delay in upper and lower portions is measured in step S952.

Subsequently, if Δev exceeds a value, for example, 0.65 Ev in step S962, Gamma Correction is performed in step S972. If the conditions are satisfied, an Encrypting File System (EFS) Profile calibration coefficient and G. Correction Curve are obtained in steps S954, S956 using the measured delay when the delay in upper and lower portions is measured in step S944.

If an EFS Profile calibration coefficient is obtained in step S954 and Δev exceeds a value, for example, 0.4 Ev in step S964, an EFS Profile is updated in step S974.

If G. Correction Curve is obtained in step S956 and Aev exceeds a value, for example, 0.4 65 v in step S966, Gamma Correction is performed in step S976.

The present invention may include a computer reading and recoding medium including a program to execute the above-described photographing method and the method for correcting a moving characteristic. The computer reading and recording medium includes all types of recording apparatuses that store data readable by a computer system, and examples include a Read Only Memory (ROM), a Random Access Memory (RAM), a CD-ROM, a magnetic tape, a floppy disk, and a optical data storage apparatus. The computer reading and recording medium is distributed to a computer system connected through a network, and a code that the computer may read through a variance method may be stored and executed.

As described above, according to the present invention, a moving characteristic of a mechanical rear curtain may be detected by scanning an even line reset on an active dummy area that is not used during actual photographing. Thus, a moving characteristic of an electronic front curtain may be conveniently corrected by a user. In addition, a photographed image may be corrected later using light exposure error calculated during the correction. Accordingly, light exposure error which could occur in the process of correcting a moving characteristic of an electronic front curtain may be minimized.

The foregoing embodiments and advantages are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A photographing apparatus comprising:
   a detection unit for detecting light exposure information resulting from a difference in a moving characteristic between a rear curtain and a front curtain using data of at least one dummy area of a plurality of dummy areas of an image sensor;
   a signal generating unit for generating a reset signal of the image sensor; and
   a control unit for controlling to correct a moving characteristic of at least one of the front curtain and the rear curtain using the detected light exposure information and for controlling the signal generating unit to generate a reset signal of the image sensor according to the corrected moving characteristic,
   wherein the at least one dummy area of the plurality of dummy areas does not form an image during photographing, and the plurality of dummy areas are located adjacent to respective upper and lower parts of an active area, which forms an image during photographing.

2. The photographing apparatus as claimed in claim 1, wherein the front curtain is an electric front curtain and the rear curtain is a mechanical rear curtain.

3. The photographing apparatus as claimed in claim 1, wherein the light exposure information is an amount of light exposure based on a light exposure time.

4. The photographing apparatus as claimed in claim 1, wherein the control unit controls to correct a delay amount of at least one of the front curtain and the rear curtain using the detected light exposure information and to generate the reset signal by correcting the reset signal according to the corrected delay amount.

5. The photographing apparatus as claimed in claim 1, wherein the control unit controls to correct the moving characteristic of at least one of the front curtain and the rear curtain using a light exposure information detected in previous photographing and to apply to a present photographing by correcting the reset signal according to the corrected moving characteristic.

6. The photographing apparatus as claimed in claim 1, further comprising:
   an image correction unit which performs follow-up correction later on a pre-photographed image using the detected light exposure information.

7. The photographing apparatus as claimed in claim 6, wherein the control unit controls the image correction unit to perform the follow-up correction when a light exposure information of the pre-photographed image is more than a predetermined threshold.

8. A photographing method comprising:
   detecting light exposure information resulting from a difference in a moving characteristic between a rear curtain and a front curtain using data of at least one dummy area of a plurality of dummy areas of an image sensor;
   correcting a moving characteristic of at least one of the front curtain and the rear curtain using the detected light exposure information; and
   generating a reset signal of the image sensor according to the corrected moving characteristic,
   wherein the at least one dummy area of the plurality of dummy areas does not form an image during photographing, and the plurality of dummy areas are located adjacent to respective upper and lower parts of an active area, which forms an image during photographing.

9. The photographing method as claimed in claim 8, wherein the front curtain is an electric front curtain and the rear curtain is a mechanical rear curtain.

10. The photographing method as claimed in claim 8, wherein the light exposure information is an amount of light exposure based on a light exposure time.

11. The photographing method as claimed in claim 8, wherein the correcting corrects a delay amount of at least one of the front curtain and the rear curtain using the detected light exposure information; and
    wherein the generating generates the reset signal by correcting the reset signal according to the corrected delay amount.

12. The photographing method as claimed in claim 8, wherein the correcting corrects the moving characteristic of at least one of the front curtain and the rear curtain using a light exposure information detected in previous photographing further comprising:
    applying to a present photographing by correcting the reset signal according to the corrected moving characteristic.

13. The photographing method as claimed in claim 8, further comprising:
    performing a follow-up correction later on a pre-photographed image using the detected light exposure information.

14. The photographing method as claimed in claim 13, wherein the performing follow-up correction later performs the follow-up correction is performed when a light exposure information of the pre photographed image is more than a predetermined threshold.

* * * * *